US012603024B2

(12) United States Patent
Ishiguro et al.

(10) Patent No.: US 12,603,024 B2
(45) Date of Patent: Apr. 14, 2026

(54) DISPLAY CONTROL DEVICE

(71) Applicant: NTT DOCOMO, INC., Tokyo (JP)

(72) Inventors: Kei Ishiguro, Chiyoda-ku (JP);
Tomohito Yamasaki, Chiyoda-ku (JP);
Mikio Iwamura, Chiyoda-ku (JP);
Masayuki Yokoo, Chiyoda-ku (JP);
Fuminori Shinsei, Chiyoda-ku (JP)

(73) Assignee: NTT DOCOMO, INC., Tokyo (JP)

( * ) Notice: Subject to any disclaimer, the term of this
patent is extended or adjusted under 35
U.S.C. 154(b) by 143 days.

(21) Appl. No.: 18/684,393

(22) PCT Filed: Jun. 9, 2022

(86) PCT No.: PCT/JP2022/023339
§ 371 (c)(1),
(2) Date: Feb. 16, 2024

(87) PCT Pub. No.: WO2023/026634
PCT Pub. Date: Mar. 2, 2023

(65) Prior Publication Data
US 2024/0363044 A1      Oct. 31, 2024

(30) Foreign Application Priority Data

Aug. 25, 2021      (JP) ................................. 2021-136994

(51) Int. Cl.
*G06T 7/70*          (2017.01)
*G06T 19/00*          (2011.01)
(Continued)

(52) U.S. Cl.
CPC .............. *G09G 3/003* (2013.01); *G06T 7/70*
(2017.01); *G06T 19/006* (2013.01); *G06T*
*19/20* (2013.01)

(58) Field of Classification Search
CPC ......... G09G 3/003; G06T 7/70; G06T 19/006;
G06T 19/20
(Continued)

(56) References Cited

U.S. PATENT DOCUMENTS

| | | | | |
|---|---|---|---|---|
| 2015/0277699 A1* | 10/2015 | Algreatly | .............. | G06F 3/0304 |
| | | | | 715/850 |
| 2018/0046352 A1* | 2/2018 | Johnson | .............. | G06F 3/04812 |
| 2021/0191124 A1* | 6/2021 | Ohashi | ..................... | H04N 5/64 |

FOREIGN PATENT DOCUMENTS

JP          2002-157606 A      5/2002

OTHER PUBLICATIONS

International Preliminary Report on Patentability and Written Opinion issued Mar. 7, 2024, in PCT/JP2022/023339, 5 pages.
(Continued)

*Primary Examiner* — Hai Tao Sun
(74) *Attorney, Agent, or Firm* — Oblon, McClelland,
Maier & Neustadt, L.L.P.

(57) ABSTRACT

A display control device includes a mode detecting unit configured to detect a mode corresponding to a level of understanding of a spatial structure of a real space displayed on a display unit and a control unit configured to control a display mode of a virtual object on the display unit according to the mode detected by the mode detecting unit. The control unit changes the display mode of the virtual object on the display unit from a first display mode corresponding to a first mode to a second display mode corresponding to a second mode via one or more intermediate display modes between the first display mode and the second display mode when the mode detected by the mode detecting unit changes from the first mode corresponding to a first level of understanding to the second mode corresponding to a second level of understanding.

9 Claims, 5 Drawing Sheets

(51) Int. Cl.
    *G06T 19/20*      (2011.01)
    *G09G 3/00*      (2006.01)
(58) Field of Classification Search
    USPC ......................................................... 345/633
    See application file for complete search history.

(56)              References Cited

OTHER PUBLICATIONS

International Search Report mailed on Aug. 23, 2022 in PCT/JP2022/023339 filed on Jun. 9, 2022, 2 pages.

* cited by examiner (A)

(B)

START

ACQUIRE LOCATION INFORMATION INDICATING LOCATION OF REAL SPACE DISPLAYED ON DISPLAY UNIT  S1

DETECT MODE CORRESPONDING TO LEVEL OF UNDERSTANDING OF REAL SPACE  S2

HAS FIRST MODE BEEN DETECTED?  S3

YES

NO

DISPLAY VIRTUAL OBJECT IN FIRST DISPLAY MODE  S4

CHANGE VIRTUAL OBJECT FROM FIRST DISPLAY MODE TO SECOND DISPLAY MODE  S5

DISPLAY CONTROL DEVICE

TECHNICAL FIELD

An aspect of the present invention relates to a display control device.

BACKGROUND ART

In the related art, a technique of providing mixed reality (MR) in which a real space and a virtual space are mixed to a user is known. For example, Patent Literature 1 discloses that an image in which an anteroposterior relationship between a real object and a virtual object is reflected (that is, an image in which an occlusion process has been performed on the virtual object) is acquired by calculating a positional relationship between an object in a real space (hereinafter referred to as a "real object") and an object in a virtual space (hereinafter referred to as a "virtual object") which are displayed on a display unit such as a display, preparing a mask corresponding to a shape of a part of the real object covering the virtual object based on the calculation result, superimposing the mask on the virtual space, and removing a non-displayed part of the virtual object (that is, a part covered by the real object).

CITATION LIST

Patent Literature

[Patent Literature 1] Japanese Unexamined Patent Application Publication No. 2002-157606

SUMMARY OF INVENTION

Technical Problem

In order to appropriately and immediately perform the occlusion process, data on a spatial structure (a three-dimensional structure) (hereinafter referred to as "space data") of the real space displayed on the display unit needs to be acquired in advance. However, it is not realistic to acquire space data of all locations in the real space in advance. Accordingly, in general, the real space includes an area on which space data has been acquired (hereinafter referred to as a "first area") and an area on which space data has not been acquired (hereinafter referred to as a "second area"). The occlusion process can be performed when the first area is displayed on the display unit, but the occlusion process cannot be performed when the second area is displayed on the display unit. Accordingly, when it is set to perform the occlusion process when the first area is displayed on the display unit and not to perform the occlusion process when the second area is displayed on the display unit and the real space displayed on the display unit changes from one of the first area and the second area to the other, a display mode of the virtual object on the display unit may change rapidly to give discomfort to a user.

Therefore, an objective of an aspect of the present invention is to provide a display control device that can reduce discomfort of a user in a structure for presenting a virtual object along with a real space to the user.

Solution to Problem

A display control device according to an aspect of the present invention is a display control device that performs display control of a display unit on which a virtual object along with a real space is displayed. The display control device includes a mode detecting unit configured to detect a mode corresponding to a level of understanding of a spatial structure of the real space displayed on the display unit and a control unit configured to control a display mode of the virtual object on the display unit according to the mode detected by the mode detecting unit. The control unit changes the display mode of the virtual object on the display unit from a first display mode corresponding to a first mode to a second display mode corresponding to a second mode via one or more intermediate display modes between the first display mode and the second display mode when the mode detected by the mode detecting unit changes from the first mode corresponding to a first level of understanding to the second mode corresponding to a second level of understanding.

In the display control device according to the aspect of the present invention, the mode corresponding to the level of understanding of the spatial structure of the real space displayed on the display unit is detected by the mode detecting unit. The virtual object is displayed on the display unit in a display mode corresponding to the mode by the control unit. More specifically, when the mode changes from the first mode to the second mode, the display mode of the virtual object is changed from the display mode corresponding to the first mode (the first display mode) to the display mode corresponding to the second mode (the second display mode) via one or more intermediate display modes by the control unit. That is, when the mode changes, the control unit gradually changes the display mode from the display mode (the first display mode) corresponding to the pre-change mode (the first mode) to the display mode (the second display mode) corresponding to the post-change mode (the second mode) instead of immediately reflecting the display mode (the second display mode) corresponding to the detected newest mode (the second mode) in the virtual object. When the mode changes through this process, it is possible to prevent the display mode of the virtual object from changing rapidly. As a result, it is possible to reduce discomfort of a user.

Advantageous Effects of Invention

According to the aspect of the present invention, it is possible to provide a display control device that can reduce discomfort of a user in a structure for presenting a virtual object along with a real space to the user.

DESCRIPTION OF EMBODIMENTS

Hereinafter, an embodiment of the present invention will be described in detail with reference to the accompanying drawings. In description with reference to the drawings, the same or corresponding elements will be referred to by the same reference signs, and repeated description thereof will be omitted.

Figure 1:
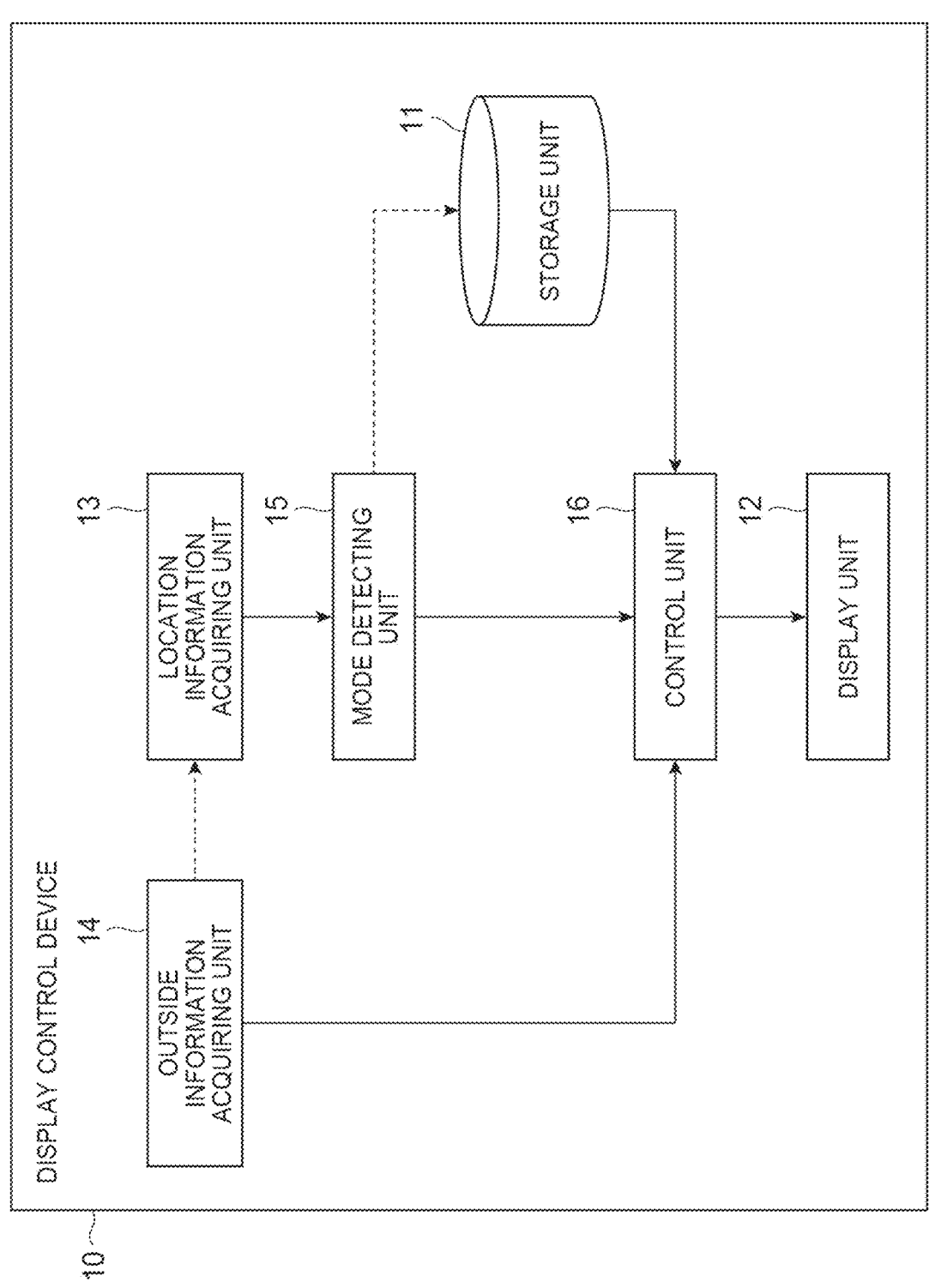
FIG. 1 is a diagram illustrating an example of a functional configuration of a display control device according to an embodiment.

FIG. 1 is a diagram illustrating an example of a display control device 10 according to an embodiment. The display control device 10 is a computer system that provides experiences of augmented reality (AR) or mixed reality (MR) to a user by providing an image in which a virtual object (virtual content) along with a real space is displayed (hereinafter referred to as a "content image") to the user.

The type of the display control device 10 is not limited to a specific type. For example, the display control device 10 may be a wearable device that is mounted on the head of a user. Examples of such display control device 10 include an eyeglass type device (for example, smart glasses such as so-called AR/MR glasses), a goggle type device, and a hat type device. Alternatively, the display control device 10 may be a mobile terminal such as a smartphone or a tablet that is held by a user.

A virtual object is virtual content which is not actually present in a real space. Content is arbitrary display information which is two-dimensionally or three-dimensionally displayed. The virtual object may be an object imitating an object (such as living things) which is present in the real world or may be an object imitating an imaginary object which is not present in the real world. The virtual object may be able to be operated by a user. For example, the virtual object may be configured as an object imitating a soap bubble. For example, when an operation of touching the virtual object (the soap bubble) is performed through a hand tracking gesture, a controller operation, or the like of a user, the virtual object (the soap bubble) may be broken and another object stored in advance in the virtual object may be displayed to be developed.

Figure 2:
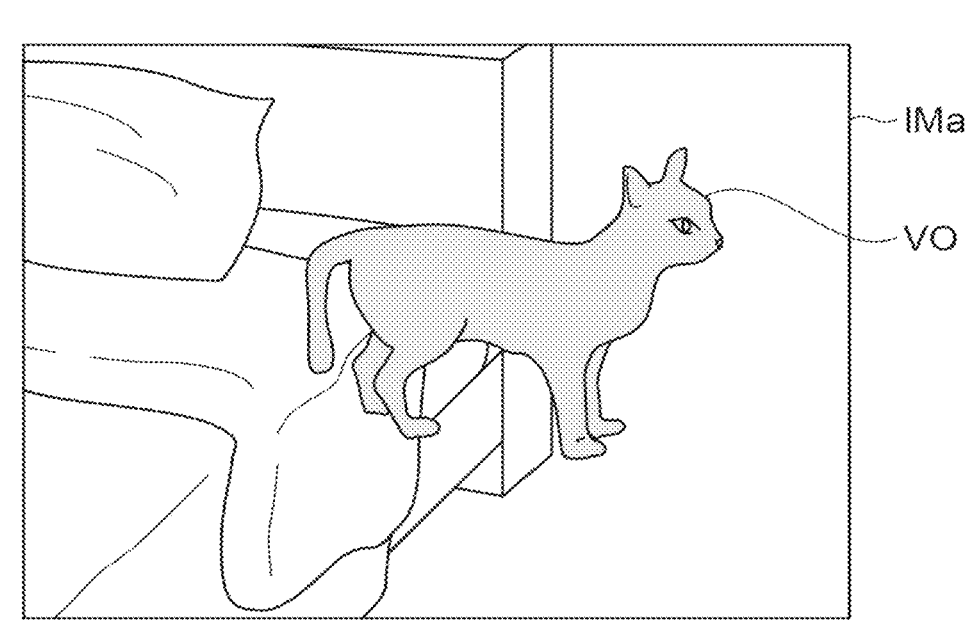
FIG. 2 is a diagram illustrating an example of a content image which is provided to a user by the display control device.
Figure 2:
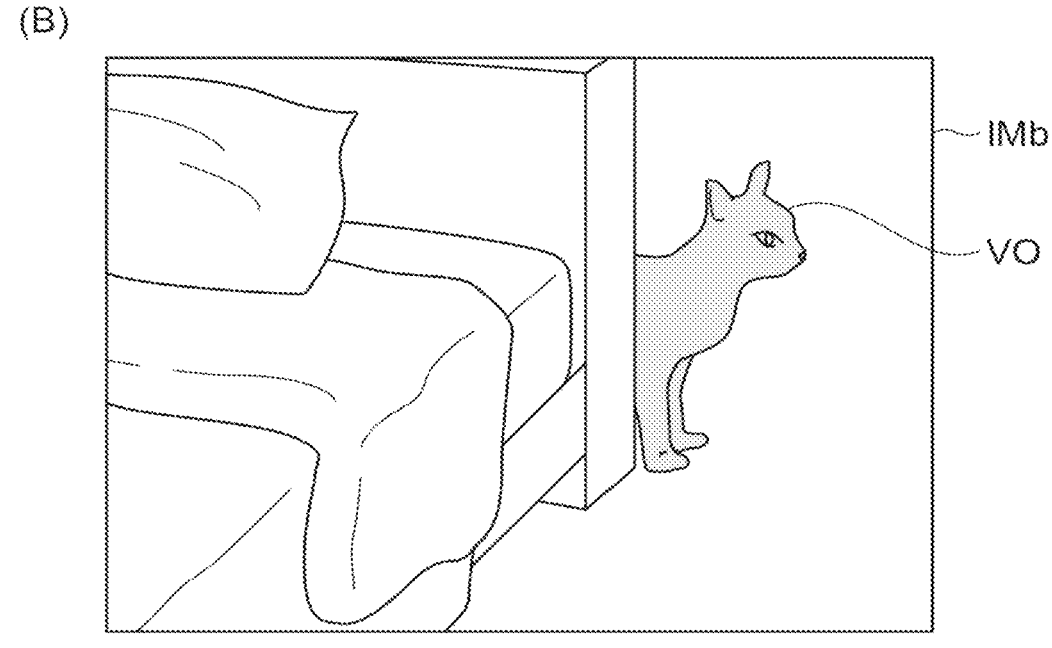

An example of a content image will be described below with reference to FIG. 2. A content image IMa illustrated in (A) of FIG. 2 is an image in which a virtual object VO imitating a cat is superimposed on a photographed image indicating a real space. On the other hand, a content image IMb illustrated in (B) of FIG. 2 is an image in which a part of the virtual object VO (a rear part of the body of the cat in this example) is displayed to be hidden in a real object (a bed in this example) present in the real space.

The content image IMa is an image in which the virtual object VO is simply superimposed on the photographed image without considering a positional relationship (particularly a positional relationship in an anteroposterior direction (a depth direction)) between the virtual object VO and the real object. That is, the content image IMa is an image in which the virtual object VO is displayed to overlap the photographed image without performing an occlusion process (that is, an image displayed in AR). On the other hand, the content image IMb is an image in which the virtual object VO is displayed on the photographed image in a mode with a higher degree of fusion by performing an occlusion process in consideration of the positional relationship between the virtual object VO and the real object (that is, an image displayed in MR).

As a technique of precisely estimating a positional relationship between a virtual object and a real object to generate an image to which an occlusion function is applied such as the content image IMb, two techniques of an image recognition type and a space recognition type are mainly used.

The image recognition type is a technique of performing image recognition on image data of a real space acquired by a camera or the like (an outside information acquiring unit 14 which will be described later or the like) of the display control device 10 and predicting an anteroposterior relationship between a real object and a virtual object based on the image recognition result. According to the image recognition type, there is a merit that information of a real space (space data required for the space recognition type which will be described later) does not need to be acquired in advance. On the other hand, since the precision of image recognition is restrictive, there is a demerit that occlusion display cannot be performed with a high precision in a real space having a complicated structure.

The space recognition type is a technique of performing self-location recognition (self-location estimation) and spatial structure recognition (depth estimation) and predicting an anteroposterior relationship between a real object and a virtual object based on the recognition result.

Self-location recognition is a technique of recognizing a self-location (that is, a viewpoint and a sightline direction (orientation) for defining a real space displayed on the display unit 12) by comparing information on feature points extracted by the camera or the like (the outside information acquiring unit 14 which will be described later or the like) of the display control device 10 with feature point group data collected in advance by a sensor (such as a camera or a laser) in the real space. The self-location recognition can be realized, for example, by using an inertial measurement unit (IMU), simultaneous localization and mapping (SLAM), or the like.

Spatial structure recognition is a technique of identifying a location of the real space by extracting a feature point group acquired by applying an algorithm such as SLAM to a picture obtained by photographing a real space displayed on the display unit 12 from pictures obtained by photographing various locations in advance using the same algorithm and comparing the extracted feature point group with a stored reference map of feature point groups and recognizing a spatial structure in a direction which the display control device 10 faces (that is, a sightline direction for defining the real space displayed on the display unit 12) by acquiring spatial structure data corresponding to the location. Here, the spatial structure data is prepared in advance by Light Detection And Ranging (LiDAR), photogrammetry, or the like. Regarding information within 3 m from the display control device 10, recognition of a spatial structure may be performed using data acquired by sensing a depth with a depth sensor (a ToF sensor (LiDAR) or the like) provided in the display control device 10 along with the spatial structure data. The recognition of a spatial structure may be performed by the cloud (that is, a server group communicatively connected to the display control device 10) or may be performed locally by the display control device 10.

According to the space recognition type, occlusion display can be performed with a higher precision than that of the image recognition type. On the other hand, space data (feature point group data and spatial structure data) on a location (an area) of the real space displayed on the display unit 12 is required for performing the self-location recognition and the spatial structure recognition. Examples of a location of which space data is prepared (that is, a location of which space data is acquired in advance) include a public space such as the Shibuya Crossing and a semipublic space such as a shopping mall. However, space data on all locations in the real space cannot be acquired in advance. That is, there is a location of which space data is not prepared. When a location of which space data is not acquired is displayed on the display unit 12, it is not realistic to acquire (scan) space data of the location in real time in view of a computing load (a computing time) and a necessary machine power.

In consideration of the above description, when space data of a location in a real space displayed on the display unit 12 has been acquired already, the display control device 10 is configured to estimate a positional relationship between a virtual object and a real object by performing the space recognition type process and to generate a content image (an image displayed in MR) to which an occlusion function is applied such as the content image IMb illustrated in (B) of FIG. 2 based on the estimation result. On the other hand, when space data of a location of a real space displayed on the display unit 12 has not been acquired, the display control device 10 is configured to generate a content image (an image displayed in AR) to which the occlusion function is not applied such as the content image IMa illustrated in (A) of FIG. 2.

On the other hand, in this configuration, when a user (the display control device 10) moves from a location of which space data has not been acquired to a location of which space data has been acquired, a content image to which the occlusion function is not applied (for example, an image in which the virtual object VO is displayed to merely overlap a photographed image such as the content image IMa illustrated in (A) of FIG. 2) may change rapidly to a content image to which the occlusion function is applied (for example, an image in which a part or all of the virtual object VO is hidden in the real object in consideration of a positional relationship between a real object and a virtual object VO such as the content image IMb illustrated in (B) of FIG. 2). As a result, a user of the display control device 10 may feel discomfort.

Therefore, the display control device 10 is configured to perform display control for reducing such discomfort. In the following description, functions of the display control device 10 for realizing the display control will be mainly described in detail.

As illustrated in FIG. 1, the display control device 10 includes a storage unit 11, a display unit 12, a location information acquiring unit 13, an outside information acquiring unit 14, a mode detecting unit 15, and a control unit 16.

The storage unit 11 is a non-transitory storage medium or a storage device that stores space data including the feature point group data and the spatial structure data. Space data (the feature point group data and the spatial structure data) is stored, for example, for each location (for example, each area identified by a range of latitude and longitude or the like) in the storage unit 11. For example, the space data is downloaded from a server device or the like that is managed by a service provider that provides space data via a communication network (for example, an arbitrary network such as the Internet) and is stored in the storage unit 11.

The display unit 12 is a display on which a content image is displayed. When the display control device 10 is a wearable device mounted on the head of a user, the display unit 12 is a display which is disposed in front of two eyes of the user. The display unit 12 is constituted, for example, by a liquid crystal display device or an organic electroluminescence (EL) device. The display unit 12 may separately include a right-eye display panel disposed in front of the right eye of the user and a left-eye display panel disposed in front of the left eye of the user. When the display control device 10 is a mobile terminal such as a smartphone or a tablet, the display unit 12 is constituted by a touch panel display.

The display unit 12 may be constituted by an optical see-through (transmission type) display or may be constituted by a video see-through display. In the former, a transmission image of a real space which is optically transmitted is displayed on the display unit 12. In the latter, an image (a video) acquired (captured) in real time by the outside information acquiring unit 14 (camera) is displayed on the display unit 12.

The location information acquiring unit 13 acquires location information indicating a location in the real space displayed on the display unit 12. For example, the location information acquiring unit 13 may acquire location information indicating a location (latitude and longitude) of the display control device 10 using a positioning function such as GPS provided in the display control device 10. When the display control device 10 receives radio waves from a radio access point, the location information acquiring unit 13 may extract an identifier (for example, an SSID of Wi-Fi (registered trademark)) for uniquely identifying the radio access point from the radio waves and acquire location information indicating a location corresponding to the extracted identifier (that is, a location of the radio access point). The location information acquiring unit 13 may perform image recognition on an image of the real space acquired by the outside information acquiring unit 14 and acquire location information correlated with a specific object with which location information is correlated in advance when the specific object (for example, a specific building, marker, bronze statue, or monument) is recognized. The location information acquiring unit 13 can identify a location corresponding to the location information acquired as described above, for example, with reference to table information in which location information and locations are correlated in advance.

The outside information acquiring unit 14 acquires an image of a real space. The outside information acquiring unit 14 can be constituted, for example, by a camera. The position and direction of the outside information acquiring unit 14 (camera) are set to face a real space which can be viewed via a transmissive display (the display unit 12) by a user. The outside information acquiring unit 14 may include a depth sensor that measures a distance to each object appearing in the image. The precision of the outside information acquiring unit 14 (the depth sensor) provided in the display control device 10 is restricted and is lower than the precision of the space recognition type.

The image of the real space (hereinafter referred to as a "first real image") acquired by the outside information acquiring unit 14 corresponds to an image of the real space (hereinafter referred to as a "second real image") displayed on the display unit 12. When the display unit 12 is constituted by a video see-through display, the first real image acquired by the outside information acquiring unit 14 is displayed on the display unit 12 and thus the first real image and the second real image match. When the display unit 12 is constituted by an optical see-through display, the first real image acquired by the outside information acquiring unit 14 is not displayed on the display unit 12, and thus the first real image and the second real image do not match completely, but the first real image indicates the same content as the second real image. Accordingly, the control unit 16 which will be described later can grasp display contents on the display unit 12 (for example, what real object is displayed at what display position on the display unit 12) with reference to the first real image acquired by the outside information acquiring unit 14. The control unit 16 can identify a real object superimposed on a virtual object based on the grasped information.

The mode detecting unit 15 continuously detects a mode corresponding to a level of understanding of the spatial structure of the real space displayed on the display unit 12. In this embodiment, for example, the level of understanding of the spatial structure of the real space includes a first level of understanding and a second level of understanding. That is, in this embodiment, the mode includes a first mode corresponding to the first level of understanding and a second mode corresponding to the second level of understanding.

For example, the first level of understanding corresponds to a state in which a positional relationship between a real object included in the real space and a virtual object which are displayed on the display unit 12 cannot be identified with a predetermined precision or higher. On the other hand, the second level of understanding corresponds to a state in which a positional relationship between a real object included in the real space and a virtual object which are displayed on the display unit 12 can be identified with the predetermined precision or higher. In this embodiment, the "predetermined precision" is a precision obtained by performing the space recognition type technique. Here, the "predetermined precision" is not limited to determination based on the aforementioned reference, but can be arbitrary set by a service provider or a user.

The first level of understanding corresponds to a state in which the space recognition type technique cannot be performed. In other words, the first level of understanding corresponds to a state in which space data corresponding to a location of the real space displayed on the display unit 12 is not available (that is, a state in which the space data is not stored in the storage unit 11) and corresponds to a relatively low level of understanding. The first mode corresponding to the first level of understanding is a mode in which the occlusion function cannot be applied to the virtual object based on the space recognition type technique.

The second level of understanding corresponds to a state in which the space recognition type technique can be performed. In other words, the second level of understanding corresponds to a state in which space data corresponding to a location of the real space displayed on the display unit 12 is available (that is, a state in which the space data is stored in the storage unit 11) and corresponds to a relatively high level of understanding. The second mode corresponding to the second level of understanding is a mode in which the occlusion function can be applied to the virtual object based on the space recognition type technique.

For example, the mode detecting unit 15 can detect (identify) a mode as follows. First, the mode detecting unit 15 acquires the location information acquired by the location information acquiring unit 13. Then, the mode detecting unit 15 determines whether space data (that is, feature point group data and spatial structure data required for performing the space recognition type technique) of the location indicated by the location information is stored in the storage unit 11. That is, the mode detecting unit 15 determines whether space data of the location indicated by the location information acquired by the location information acquiring unit 13 is available. Then, when space data is not available (that is, when the space data of the location is not stored in the storage unit 11), the mode detecting unit 15 detects the first mode. On the other hand, when the space data is available (that is, when the space data of the location is stored in the storage unit 11), the mode detecting unit 15 detects the second mode.

The control unit 16 controls a display mode of a virtual object on the display unit 12 according to the mode (the first mode or the second mode in this embodiment) detected by the mode detecting unit 15. The control unit 16 determines a display position of the virtual object on the content image displayed on the display unit 12, for example, based on a predetermined arrangement rule of a virtual object (for example, a location of a virtual object relative to a user (that is, a distance between a user and a virtual object or the like)), a motion pattern (for example, a pattern in which a virtual object floats in a space in front of a user), and the like. The control unit 16 determines the display mode of the virtual object according to the mode detected by the mode detecting unit 15.

When the mode detected by the mode detecting unit 15 changes from the first mode to the second mode, the control unit 16 changes the display mode of the virtual object on the display unit 12 from the first display mode corresponding to the first mode to the second display mode corresponding to the second mode via one or more intermediate display mode between the first display mode and the second display mode. A specific example of the process which is performed by the control unit 16 will be described later.

Figure 3:
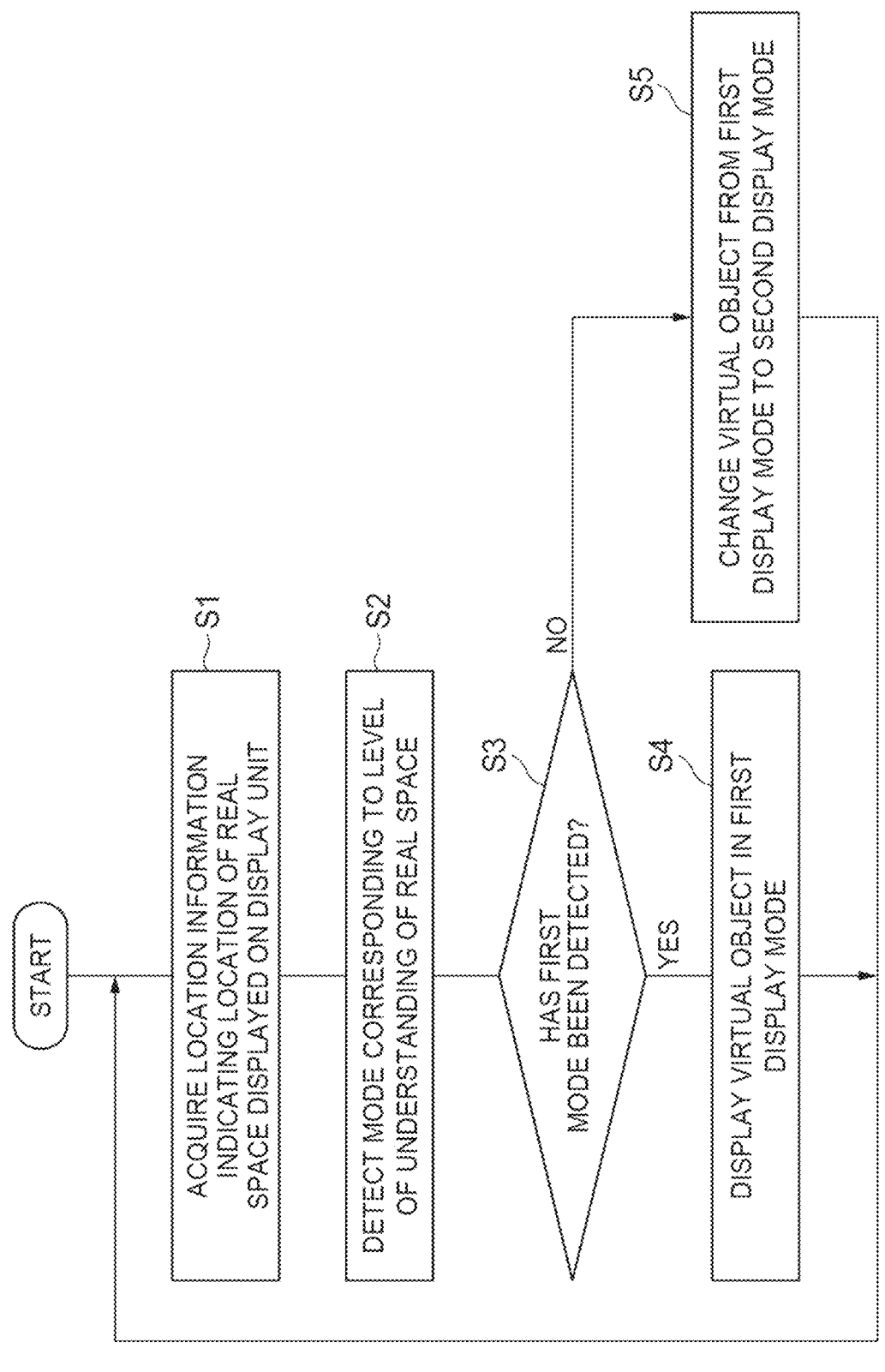
FIG. 3 is a flowchart illustrating an example of an operation of the display control device.

An example of an operation (including a display control method according to an embodiment) which is performed by the display control device 10 will be described below with reference to FIG. 3.

In Step S1, the location information acquiring unit 13 acquires location information indicating a location of a real space displayed on the display unit 12 (that is, a content image).

In Step S2, the mode detecting unit 15 detects a mode corresponding to a level of understanding of the real space displayed on the display unit 12. In this embodiment, the mode detecting unit 15 detects (identifies) a mode based on whether space data of a location indicated by the location information acquired by the location information acquiring unit 13 is stored in the storage unit 11. More specifically, the mode detecting unit 15 detects the first mode when the space data of the location is not stored in the storage unit 11. On the other hand, the mode detecting unit 15 detects the second mode when the space data of the location is stored in the storage unit 11.

In Step S3, the control unit 16 determines whether the mode detected by the mode detecting unit 15 is the first mode. When the detected mode is the first mode (Step S3: YES), the control unit 16 performs the process of Step S4. On the other hand, when the detected mode is the second mode (Step S3: NO), the control unit 16 performs the process of Step S5.

In Step S4, the control unit 16 displays the virtual object in the first display mode corresponding to the first mode.

In this embodiment, the first display mode includes a display mode in which a virtual object is displayed in front of (on the near side of) a real object regardless of an original positional relationship between the virtual object and the real object. That is, the first display mode includes a display mode in which the occlusion function is not applied such as the content image IMa illustrated in (A) of FIG. 2. The first display mode includes a display mode in which a virtual object is displayed in a size (a first size) smaller than a size (a second size) in the second display mode corresponding to the second mode. For example, the second size is a standard size preset for the virtual object, and the first size is a size (a size which is applied when the virtual object is reduced for display) smaller than the standard size.

Figure 4:
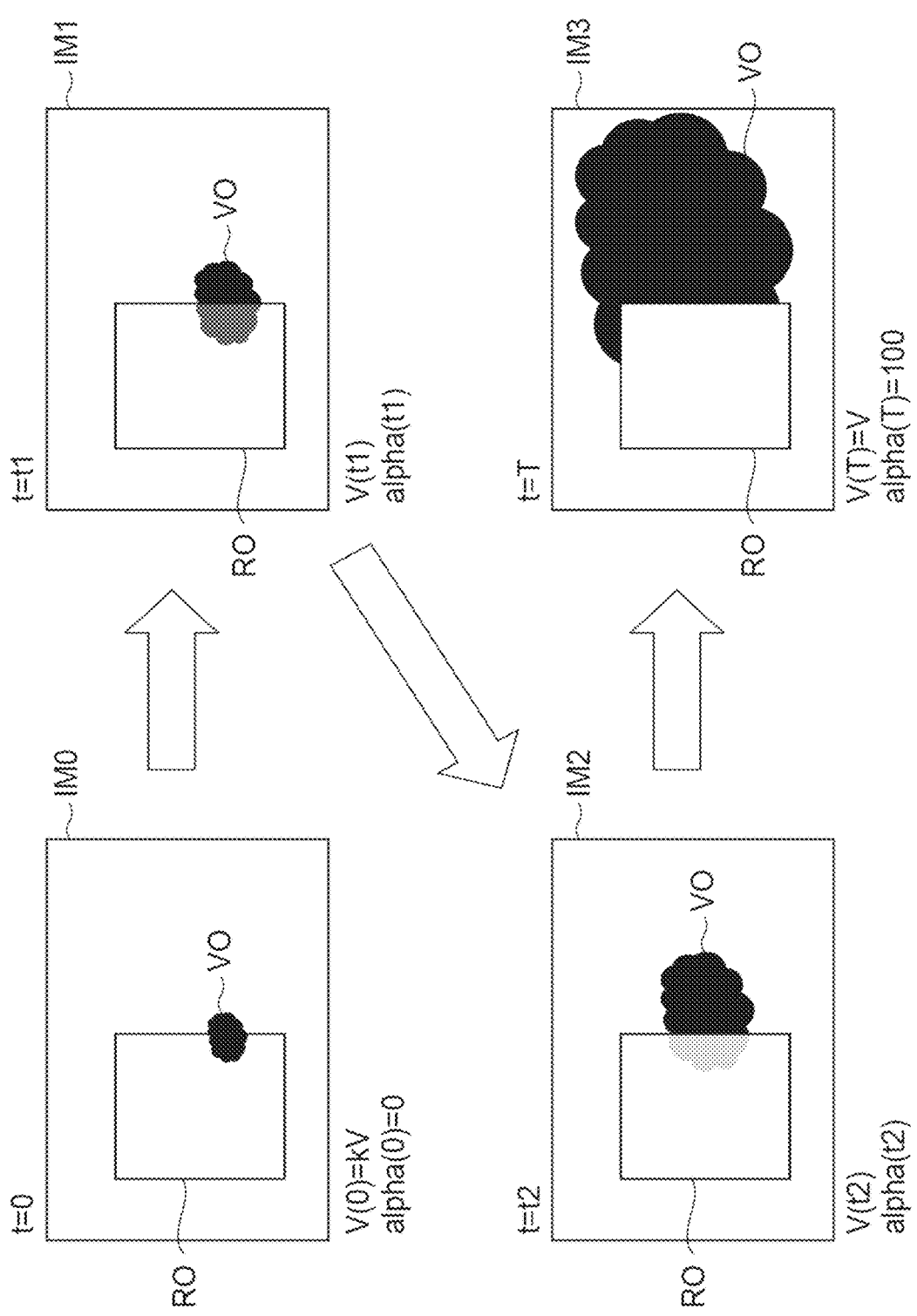
FIG. 4 is a diagram schematically illustrating an example of the process of Step S5 in FIG. 3.

In Step S4, first, the control unit 16 determines a position at which the virtual object is arranged on the content image based on a predetermined arrangement rule of the virtual object, a motion pattern, and the like. Subsequently, the control unit 16 displays the virtual object in the first display mode. A virtual object VO in a content image IM0 illustrated in FIG. 4 is an example of a virtual object displayed in the first display mode. In this example, a part of the virtual object VO overlaps a real object RO included in the content image IM0. Here, it is assumed that a position in the depth direction of the virtual object VO determined based on the arrangement rule, the motion pattern, and the like is actually located behind (on the deep side of) the real object RO. However, in the first mode, space data is not available and the occlusion process cannot be precisely performed. Therefore, the control unit 16 displays the virtual object VO in the first display mode. That is, the control unit 16 displays the virtual object in a volume "kV (0<k<1)" (first size) smaller than a present original volume "V." The control unit 16 displays the virtual object VO in front of (on the near side of) the real object RO regardless of the original positional relationship between the virtual object VO and the real object RO.

By performing the process of Step S4, the content image IM0 including the virtual object VO displayed in the first display mode along with the real space is displayed on the display unit 12. A user can experience augmented reality (AR) by viewing the content image IM0 displayed on the display unit 12.

After the process of Step S4 has been performed, the processes of Steps S1 to S3 are continuously performed (for example, periodically every predetermined period). For example, when a user moves along with the display control device 10 and enters a location in which corresponding space data is present (for example, the aforementioned public space or semi-public space), the mode detecting unit 15 detects the second mode in Step S2. Alternatively, when the user has not moved, but spatial scan of the location of the real space displayed on the display unit 12 has been completed and space data of the location has been acquired, the mode detecting unit 15 can detect the second mode in Step S2 performed subsequently. In this case, the determination result of Step S3 is "NO" and thus the process of Step S5 is performed.

In Step S5, the control unit 16 does not immediately display the virtual object VO in the second display mode corresponding to the second mode, but gradually (continuously) changes the display mode of the virtual object VO from the first display mode corresponding to the first mode to the second display mode corresponding to the second mode via one or more intermediate display modes.

In this embodiment, the second display mode includes a display mode in which a part of the virtual object VO hidden in the real object RO is displayed transparently. That is, the second display mode includes a display mode in which the occlusion function is applied such as the content image IMb illustrated in (B) of FIG. 2. The control unit 16 can display the virtual object VO in the display mode in which the occlusion function is applied as described above based on the information (image data of the real space acquired by the camera and depth data extracted by the depth sensor in this embodiment) acquired by the outside information acquiring unit 14 and space data (feature point group data and spatial structure data) stored in the storage unit 11. That is, the control unit 16 can identify the positional relationship between the real object RO and the virtual object VO using the space data and perform the occlusion process (that is, a process of transparently displaying (not displaying) a part of the virtual object VO hidden in the real object RO) based on the identified positional relationship. The second display mode includes a display mode in which the virtual object VO is displayed in a size (the second size) larger than the size (the first size) in the first display mode.

A specific example of the process of Step S5 will be described below with reference to FIG. 4. For example, the control unit 16 gradually changes the display mode of the virtual object VO from the first display mode to the second display mode such that the display mode of the virtual object VO becomes the second display mode at a time point (t=T) at which a predetermined transition period T has elapsed from a time point (t=0) at which the mode detected by the mode detecting unit 15 has changed from the first mode to the second mode. For example, when the mode first detected immediately after the display control device 10 has started is the second mode, the control unit 16 can perform the following process from a time point (t=0) at which the second mode has been first detected. In the following description, a size applied to the virtual object VO displayed on the content image at a certain time point t is defined as "V(t)," and a transparency applied to a part of the virtual object VO hidden in the real object RO at a certain time point t is defined as "alpha(t)." A transparency "0" indicates a state in which it is not transparent at all, and a transparency "100" indicates a state in which it is completely transparent.

At the start time point (t=0), the control unit 16 displays the virtual object VO in the first display mode similarly to the process of Step S4. That is, the control unit 16 sets the size (volume) of the virtual object VO to "V(0)=kV." The control unit 16 sets the transparency of a part of the virtual object VO hidden in the real object RO (a part of the virtual object VO overlapping the real object RO) to "alpha(0)=0." As a result, the content image IM0 illustrated in FIG. 4 is displayed on the display unit 12.

Subsequently, at a time point (t=t1) at which a predetermined period t1 (t1<T) has elapsed from the start time point, the control unit 16 displays the virtual object VO in an intermediate display mode (a first intermediate display mode) between the first display mode and the second display mode. For example, the control unit 16 sets the size (volume) of the virtual object VO to a value "V(t1)" which is larger than "kV" and smaller than "V." That is, "kV<V(t1)<V" is satisfied. The control unit 16 sets the transparency of a part of the virtual object VO hidden in the real object RO (that is, a part of the virtual object VO overlapping the real object RO) to a value "alpha(t1)" which is larger than "0" and smaller than "100." That is, the control unit 16 displays the part of the virtual object VO hidden in the real object RO semi-transparently such that "0<alpha(t1)<100" is satisfied. As a result, the content image IM1 illustrated in FIG. 4 is displayed on the display unit 12.

Subsequently, at a time point (t-t2) at which a predetermined period t2 (t1<t2<T) has elapsed from the start time point, the control unit 16 displays the virtual object VO in an intermediate display mode (a second intermediate display mode) between the first display mode and the second display mode. For example, the control unit 16 sets the size (volume) of the virtual object VO to a value "V(t2)" which is larger than "V(t1)" and smaller than "V." That is, "V(t1)<V(t2)<V" is satisfied. The control unit 16 sets the transparency of a part of the virtual object VO hidden in the real object RO (that is, a part of the virtual object VO overlapping the real object RO) to a value "alpha(t2)" which is larger than "alpha(t1)" and smaller than "100." That is, the control unit 16 displays the part of the virtual object VO hidden in the real object RO semi-transparently such that "alpha(t1)<alpha(t2)<100" is satisfied. As a result, the content image IM2 illustrated in FIG. 4 is displayed on the display unit 12.

Subsequently, at a time point (t=T) at which a transition period T has elapsed from the start time point, the control unit 16 displays the virtual object VO in the second display mode. That is, the control unit 16 sets the size (volume) of the virtual object VO to a value "V(second size)." The control unit 16 sets the transparency of a part of the virtual object VO hidden in the real object RO (that is, a part of the virtual object VO overlapping the real object RO) to "100." That is, the control unit 16 does not display the part of the virtual object VO hidden in the real object RO at all. As a result, the content image IM3 illustrated in FIG. 4 is displayed on the display unit 12.

In the aforementioned example, two intermediate display modes (t=t1 and t2) are described, but the number of intermediate display modes may be one. Alternatively, three or more intermediate display modes may be set such that the virtual object VO can change more smoothly from the first display mode to the second display mode.

In the aforementioned display control device 10, a mode corresponding to a level of understanding of a spatial structure of a real space displayed on the display unit 12 is detected by the mode detecting unit 15. Then, the control unit 16 displays a virtual object VO in a display mode corresponding to the detected mode on the display unit 12. More specifically, when the detected mode changes from the first mode to the second mode, the control unit 16 changes the display mode of the virtual object VO from the first display mode corresponding to the first mode (for example, the content image IM0 illustrated in FIG. 4) to the second display mode corresponding to the second mode (for example, the content image IM3 illustrated in FIG. 4) via one or more intermediate display modes (for example, the content images IM1 and IM2 illustrated in FIG. 4). That is, when the mode changes, the control unit 16 does not immediately reflect the display mode (the second display mode) corresponding to the detected newest mode (the second mode) in the virtual object VO, but gradually changes the display mode from the display mode (the first display mode) corresponding to the pre-change mode (the first mode) to the display mode (the second display mode) corresponding the post-change mode (the second mode). Through this process, it is possible to prevent the display mode of the virtual object VO from changing rapidly when the mode changes. As a result, it is possible to reduce discomfort of a user.

The control unit 16 may gradually change the display mode of the virtual object VO from the first display mode to the second display mode such that the display mode of the virtual object VO becomes the second display mode at a time point at which a predetermined transition period T has elapsed from the time point to at which the mode detected by the mode detecting unit 15 changes from the first mode to the second mode. With this configuration, since the display mode of the virtual object VO can be gradually changed in the predetermined transition period T, it is possible to change the display mode of the virtual object VO without giving discomfort to a user.

The first display mode may include a display mode (that is, a display mode in which the occlusion function is not applied) in which the virtual object VO is displayed in front of the real object RO regardless of the original positional relationship between the virtual object VO and the real object RO, the second display mode may include a display mode (that is, a display mode in which the occlusion function is applied) in which a part of the virtual object VO hidden in the real object RO is displayed transparently, and one or more intermediate display modes may include a display mode in which a part of the virtual object VO hidden in the real object RO is displayed semi-transparently (for example, the content images IM1 and IM2 illustrated in FIG. 4). With this configuration, by gradually increasing the transparency without immediately displaying the part of the virtual object VO hidden in the real object RO transparently (in a non-display manner), it is possible to change the display mode of the virtual object VO without giving discomfort to a user.

The mode detecting unit 15 may determine whether space data of a spatial structure of a location indicated by the location information acquired by the location information acquiring unit 13 is available, detect the first mode when the space data is not available, and detect the second mode when the space data is available. The control unit 16 may identify a part of the virtual object VO hidden in the real object RO based on the space data when the virtual object VO is displayed in the second display mode. With this configuration, it is possible to easily and reliably perform a mode detecting process based on whether space data for identifying a part of a virtual object VO hidden in a real object RO is available.

The first display mode may include a display mode in which a virtual object VO is displayed in a first size, the second display mode may include a display mode in which the virtual object VO is displayed in a second size different from the first size, and one or more intermediate display modes may include a display mode in which the virtual object VO is displayed in a size between the first size and the second size. With this configuration, when the mode changes, it is possible to reduce discomfort given to a user by gradually changing the size of the virtual object VO without rapidly changing the size. The second size may be larger than the first size. In this case, in the first display mode in which the occlusion function is not applied, it is possible to reduce discomfort given to a user by relatively decreasing the display size of the virtual object VO. That is, it is possible to effectively reduce discomfort of a user by preventing a part of the virtual object VO which is to be originally hidden in the real object RO (that is, to be located behind the real object RO) from being displayed largely in front of the real object RO.

Modified Examples

Variations of the first display mode and the second display mode are not limited to the embodiment. For example, the first display mode may include a display mode in which a virtual object VO is displayed in a first color tone (for example, monochrome display), the second display mode may include a display mode in which the virtual object VO is displayed in a second color tone (for example, color display) different from the first color tone, and one or more intermediate display modes may include a display mode in which the virtual object VO is displayed in a third color tone between the first color tone and the second color tone. In this case, when the mode changes, it is possible to reduce discomfort given to a user by gradually changing the color tone of the virtual object VO without rapidly changing the color tone. For example, the first color tone may be a color tone which is less conspicuous than the second color tone. In this case, it is possible to effectively reduce discomfort of a user by making the virtual object VO less conspicuous in a state (that is, the first display mode) in which the virtual object VO is not displayed through the occlusion function.

The first display mode may include a display mode in which a virtual object VO is displayed in a first shape, the second display mode may include a display mode in which the virtual object VO is displayed in a second shape different from the first shape, and one or more intermediate display modes may include a display mode in which the virtual object VO is displayed in a third shape between the first shape and the second shape. For example, the first shape is a shape (for example, a shape deformed to a simple shape such as a sphere) different from an original shape of the virtual object VO, and the second shape is the original shape (that is, a shape preset for the virtual object VO)) of the virtual object VO. In this case, when the mode changes, it is possible to reduce discomfort given to a user by gradually changing the shape of the virtual object VO without rapidly changing the shape. In a state (that is, the first display mode) in which the virtual object VO is not displayed through the occlusion function as in the aforementioned example, it is possible to allow a user to easily grasp that the occlusion function is not applied to the virtual object VO by displaying the virtual object VO in a shape (the first shape) different from the original shape thereof. As a result, it is possible to effectively prevent the user from feeling discomfort about the virtual object VO being displayed in front of the real object RO.

In the aforementioned embodiment, a relatively low level of understanding of a spatial structure is defined as the first level of understanding and a relatively high level of understanding of the spatial structure is defined as the second level of understanding, but a relatively high level of understanding of the spatial structure may be defined as the first level of understanding and a relatively low level of understanding of the spatial structure may be defined as the second level of understanding. That is, in the embodiment, when the mode changes from the second mode in which the level of understanding of the spatial structure is relatively high to the first mode in which the level of understanding of the spatial structure is relatively low, the display mode of a virtual object may be changed from the second display mode to the first display mode via one or more intermediate display modes. That is, in the example illustrated in FIG. 4, when the mode detected by the mode detecting unit 15 changes from the second mode to the first mode, the control unit 16 may change the display mode of the virtual object VO from the second display mode (the content image IM3) to the first display mode (the content image IM0) via the intermediate display modes (the content images IM2 and IM1). In this case, since rapid change of the display mode of the virtual object can be curbed, it is possible to reduce discomfort given to a user.

Regardless of a transition direction of the mode, the control unit 16 may smoothly change the display mode of the virtual object VO when the mode corresponding to the level of understanding of the spatial structure changes. For example, in the embodiment, the control unit 16 may change the display mode of the virtual object VO from the first display mode to the second display mode via one or more intermediate display modes when the mode changes from the first mode to the second mode and change the display mode of the virtual object VO from the second display mode to the first display mode via one or more intermediate display modes when the mode changes from the second mode to the first mode. In this case, it is possible to smoothly change the display mode of the virtual object VO between the modes corresponding to the level of understanding of the spatial structure and to effectively reduce discomfort of a user.

In the aforementioned embodiment, the modes corresponding to the level of understandings of the spatial structure include only two modes of the first mode and the second mode, but may include three or more modes. In this case, when the mode detected by the mode detecting unit 15 changes from one mode (corresponding to the first mode in the embodiment) of the plurality of modes to another mode (corresponding to the second mode in the embodiment), the control unit 16 may change the display mode of the virtual object VO from a display mode (corresponding to the first display mode in the embodiment) corresponding to the one mode to a display mode (corresponding to the second display mode in the embodiment) corresponding to the other mode via one or more intermediate display modes.

The control unit 16 may use the space recognition type (self-location recognition and spatial structure recognition) techniques to perform physical expression other than the occlusion process. Some specific examples of such physical expression will be described below.

A ball which is a virtual object is rolled on the floor of a real space.

A robot which is a virtual object is caused to walk on the floor of a real space.

A ball which is a virtual object is bounded from the wall of a real space.

A virtual object is made to collide with a real object (for example, the virtual object is deformed or destroyed at the time of collision).

A virtual object is moved to avoid a real object.

In the aforementioned embodiment, a user terminal such as a wearable terminal or a mobile terminal (for example, a smartphone or a tablet) used by a user serves as the display control device 10, but some or all of the functional elements other than the display unit 12 in the display control device 10 illustrated in FIG. 1 may be mounted on a device (for example, a server configured to communicate with a user terminal) other than a user terminal including the display unit 12. When the outside information acquiring unit 14 is mounted on a server other than the user terminal, the outside information acquiring unit 14 can acquire information acquired by a camera, a depth sensor, or the like provided in the user terminal by receiving the information from the user terminal. For example, when all the functional elements other than the display unit 12 in the display control device 10 are mounted on the server, the server can serve as the display control device that performs display control of the display unit 12 (that is, the display unit provided in the user terminal) on which a virtual object is displayed along with a real space. For example, when some of the functional elements other than the display unit 12 in the display control device 10 are mounted on the server, a system including the user terminal and the server can serve as the display control device that performs display control of the display unit 12 on which a virtual object is displayed along with a real space.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 5:
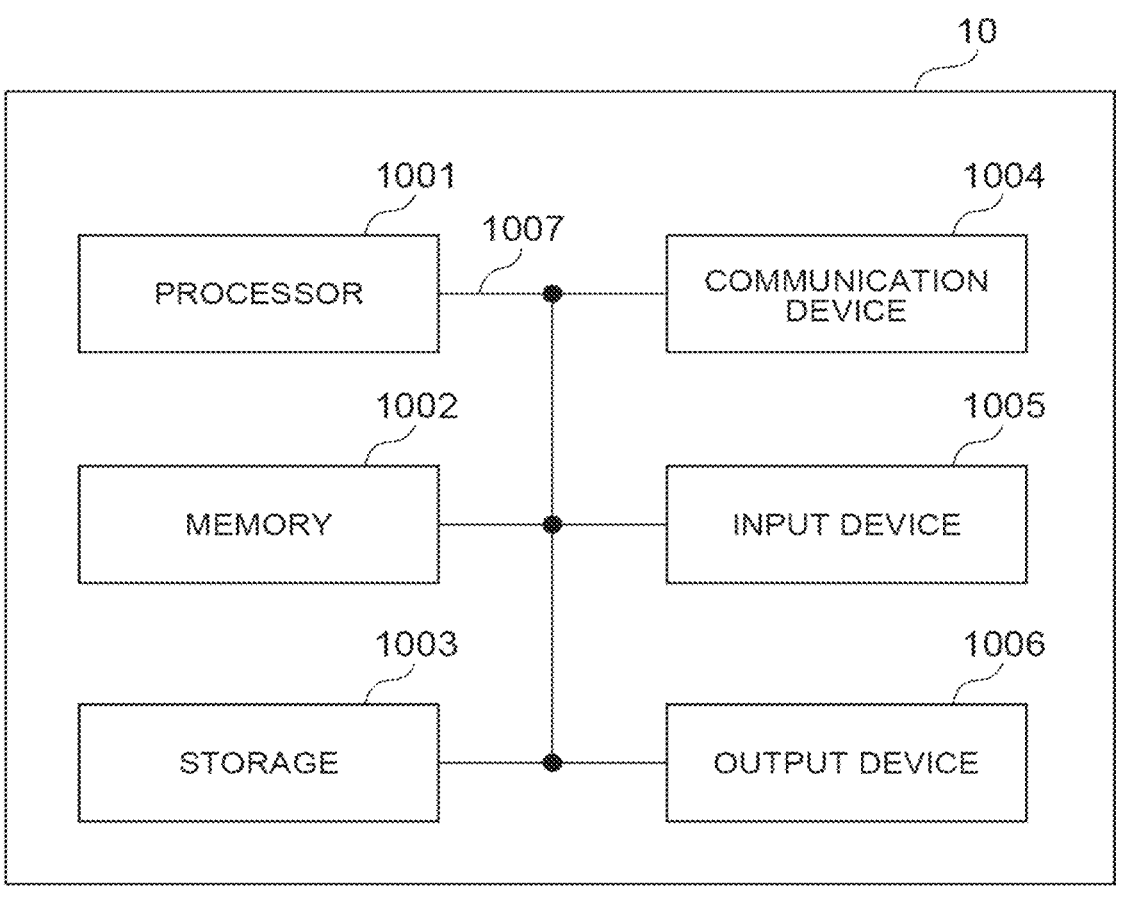
FIG. 5 is a diagram illustrating an example of a hardware configuration of the display control device.

For example, the display control device 10 according to an embodiment of the present invention may function as a computer that performs display control method of the present disclosure. FIG. 5 is a diagram illustrating an example of a hardware configuration of the display control device 10 according to the embodiment of the present disclosure. The display control device 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the display control device 10 may include one or a plurality of devices illustrated in FIG. 5, or may be configured without including some of the devices.

Each function in the display control device 10 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, each functional unit (e.g., the control unit 16) of the display control device 10 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the display control method according to the embodiment of the present disclosure.

The storage 1003 is a computer-readable recording medium and may also be configured of, for example, at least one of an optical disc such as a compact disc ROM (CD- ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different between the devices.

Further, the display control device 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Further, the information, parameters, and the like described in the present disclosure may be expressed using an absolute value, may be expressed using a relative value from a predetermined value, or may be expressed using another corresponding information.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The description "based on (on the basis of)" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as "a", "an", and "the" in English are added by translation, the present disclosure may include that nouns following these articles are plural.

In the present disclosure, a sentence "A and B are different" may mean that "A and B are different from each other". The sentence may mean that "each of A and B is different from C". Terms such as "separate", "coupled", and the like may also be interpreted, similar to "different".

REFERENCE SIGNS LIST

10 . . . Display control device
11 . . . Storage unit
12 . . . Display unit
13 . . . Location information acquiring unit
14 . . . Outside information acquiring unit
15 . . . Mode detecting unit
16 . . . Control unit
IMa, IMb, IM0, IM1, IM2, IM3 . . . Content image
RO . . . Real object
VO . . . Virtual object

The invention claimed is:

1. A display control device that performs display control of a display unit on which a virtual object along with a real space is displayed, the display control device comprising:
   processing circuitry configured to
      detect a mode corresponding to a level of understanding of a spatial structure of the real space displayed on the display unit;
      control a display mode of the virtual object on the display unit according to the detected mode; and
      change the display mode of the virtual object on the display unit from a first display mode corresponding to a first mode to a second display mode corresponding to a second mode via one or more intermediate display modes between the first display mode and the second display mode when the detected mode changes from the first mode corresponding to a first level of understanding to the second mode corresponding to a second level of understanding,
   wherein
   the processing circuitry is further configured to gradually change the display mode of the virtual object from the first display mode to the second display mode over a predetermined transition period,
   the second display mode includes a display mode in which a part of the virtual object hidden by the real object is displayed transparently,
   the one or more intermediate display modes include a display mode in which the part of the virtual object hidden in the real object is displayed semi-transparently, and
   the change from the first display mode to the second display mode indicates a transition of the virtual object's appearance relative to the real object from being displayed in front of the real object to being occluded by the real object.

2. The display control device according to claim 1, wherein the predetermined transition period elapses from a time point at which the mode detected by the processing circuitry has changed from the first mode to the second mode.

3. The display control device according to claim 1, wherein the first level of understanding is a level of understanding corresponding to a state in which a positional relationship between a real object included in the real space and the virtual object which are displayed on the display unit is not able to be identified with a predetermined precision or higher, wherein the second level of understanding is a level of understanding corresponding to a state in which a positional relationship between the real object included in the real space and the virtual object which are displayed on the display unit is able to be identified with the predetermined precision or higher, and wherein the first display mode includes a display mode in which the virtual object is displayed in front of the real object regardless of an original positional relationship between the virtual object and the real object.

4. The display control device according to claim 3, wherein the processing circuitry is further configured to acquire location information indicating a location of the real space displayed on the display unit, determine whether space data on the spatial structure of the location indicated by the acquired location information is available;

detect the first mode when the space data is not available; and detect the second mode when the space data is available; and identify the part of the virtual object hidden in the real object based on the space data when the virtual object is displayed in the second display mode.

5. The display control device according to claim 1, wherein the first display mode includes a display mode in which the virtual object is displayed in a first size, wherein the second display mode includes a display mode in which the virtual object is displayed in a second size different from the first size, and wherein the one or more intermediate display modes include a display mode in which the virtual object is displayed in a size between the first size and the second size.

6. The display control device according to claim 5, wherein the second size is larger than the first size.

7. The display control device according to claim 1, wherein the first display mode includes a display mode in which the virtual object is displayed in a first color tone, wherein the second display mode includes a display mode in which the virtual object is displayed in a second color tone different from the first color tone, and wherein the one or more intermediate display modes include a display mode in which the virtual object is displayed in a third color tone between the first color tone and the second color tone.

8. The display control device according to claim 1, wherein the first display mode includes a display mode in which the virtual object is displayed in a first shape, wherein the second display mode includes a display mode in which the virtual object is displayed in a second shape different from the first shape, and wherein the one or more intermediate display modes include a display mode in which the virtual object is displayed in a third shape between the first shape and the second shape.

9. A method implemented by processing circuitry of a display control device that performs display control of a display unit on which a virtual object along with a real space is displayed, the method comprising:

detecting a mode corresponding to a level of understanding of a spatial structure of the real space displayed on the display unit;

controlling a display mode of the virtual object on the display unit according to the detected mode, changing the display mode of the virtual object on the display unit from a first display mode corresponding to a first mode to a second display mode corresponding to a second mode via one or more intermediate display modes between the first display mode and the second display mode when the detected mode changes from the first mode corresponding to a first level of understanding to the second mode corresponding to a second level of understanding, wherein the method further includes gradually changing the display mode of the virtual object from the first display mode to the second display mode over a predetermined transition period, the second display mode includes a display mode in which a part of the virtual object hidden by the real object is displayed transparently, the one or more intermediate display modes include a display mode in which the part of the virtual object hidden in the real object is displayed semi-transparently, and the change from the first display mode to the second display mode indicates a transition of the virtual object's appearance relative to the real object from being displayed in front of the real object to being occluded by the real object.

* * * * *